United States Patent
Stanback

[15] 3,663,865
[45] May 16, 1972

[54] DIFFERENTIAL GROUND FAULT PROTECTION SYSTEM

[72] Inventor: Harris I. Stanback, Lexington, Ky.
[73] Assignee: Square D Company, Park Ridge, Ill.
[22] Filed: July 14, 1970
[21] Appl. No.: 54,766

[52] U.S. Cl. ........................................317/18 D
[51] Int. Cl. .......................................H02h 3/28
[58] Field of Search ........................317/18, 18 D

[56] References Cited

UNITED STATES PATENTS

| | | | |
|---|---|---|---|
| 3,473,091 | 10/1969 | Morris et al. | 317/18 D |
| 3,525,903 | 8/1970 | Morris et al. | 317/18 D |
| 3,535,590 | 10/1970 | Mayer | 317/18 D |

Primary Examiner—James D. Trammell
Attorney—Harold J. Rathbun and Paul J. Rose

[57] ABSTRACT

A ground fault protection system using a differential current transformer. So that an inadvertent low impedance ground of the grounded neutral conductor on the load side of a differential transformer will cause a tripping potential to be developed across the secondary winding of the differential transformer, a resistor is connected across the load conductors at the transformer.

3 Claims, 2 Drawing Figures

Patented May 16, 1972 3,663,865

INVENTOR.
HARRIS I. STANBACK
BY *Harold J. Rathbun*

DIFFERENTIAL GROUND FAULT PROTECTION SYSTEM

BACKGROUND OF THE INVENTION

This invention relates to ground fault protection systems, and, more particularly, to such a system which remains operative even if the neutral conductor is inadvertently grounded on the load side of a differential transformer of the system under no-load conditions.

The function of differential ground fault protection systems is to disconnect the power supply very rapidly whenever a stray path to ground occurs on the ungrounded conductor. For example, if a grounded person should touch the ungrounded conductor leading to an electrical load, the presence of the extraneous circuit to ground immediately trips a circuit breaker to deenergize the load and thus prevent possible serious injury or death. Most of these systems include a differential transformer having a toroidal magnetic core and at least two primary windings of one or at most a very few turns which are in series with the respective conductors feeding the load. When equal currents are passed through the windings, the resultant magnetic flux is zero. A secondary winding is also wound on the core and is arranged to provide a voltage signal to trip a circuit breaker in the line conductor. Under normal operation in two-wire systems, all of the current passing to the load through the ungrounded conductor returns to the supply through the grounded neutral conductor so that the respective magnetic fluxes cancel each other and no voltage is induced in the secondary winding. In the event of an accidental grounding of the ungrounded conductor on the load side of the transformer, however, a portion of the line current returns to the power supply through the ground. The resultant unbalance of the currents in, or current differential between, the two primary windings creates a resultant flux which induces a voltage in the secondary winding that effects tripping of the circuit breaker. Similar operations occur in protective systems for three or four wire supply circuits.

Ground fault protection systems of the above type have proved to be very satisfactory under most circumstances. However, they have one disadvantage which could create a serious safety problem. The problem arises when an inadvertent low impedance ground occurs on the neutral conductor on the load side of the differential transformer while no load is on the supply system. Since no current is drawn under no-load conditions, there is no leakage at the ground fault so that the circuit breaker cannot trip until a load is applied. If, before the connection of a load or concurrently with the connection of the load, the line conductor were to become grounded, as through a person, the circuit breaker would not operate at the same value of differential current that would cause tripping if the neutral connector were not inadvertently grounded. Because the primary winding in the grounded conductor is now grounded on both sides, the differential transformer now electrically resembles a current transformer wherein the winding in the normally ungrounded conductor is the "primary" and the winding in the normally grounded conductor is a shorted "secondary." The low impedance existing across this "secondary" winding would be reflected in accordance with the one-to-one turns ratio to the "primary." The small potential difference across the "primary" is incapable of generating sufficient power in the transformer core to provide an adequate voltage signal. Therefore, the sensitivity of the transformer is greatly reduced requiring a larger differential current to trip the circuit breaker. The lower the inadvertent impedance to ground from the neutral conductor, the lower would be the sensitivity of the ground fault protective system and the greater the safety hazard.

SUMMARY OF THE INVENTION

An object of this invention is to provide an improved ground fault protection system which is triggered by an inadvertent ground of the normally grounded neutral conductor even if there is no load on the supply system.

The object of this invention is achieved by providing a ground fault protection system including a differential transformer and having an impedance such as a resistor or capacitor connected between the grounded and ungrounded conductors on the load side of the transformer.

THE PREFERRED EMBODIMENT

Figure 1:
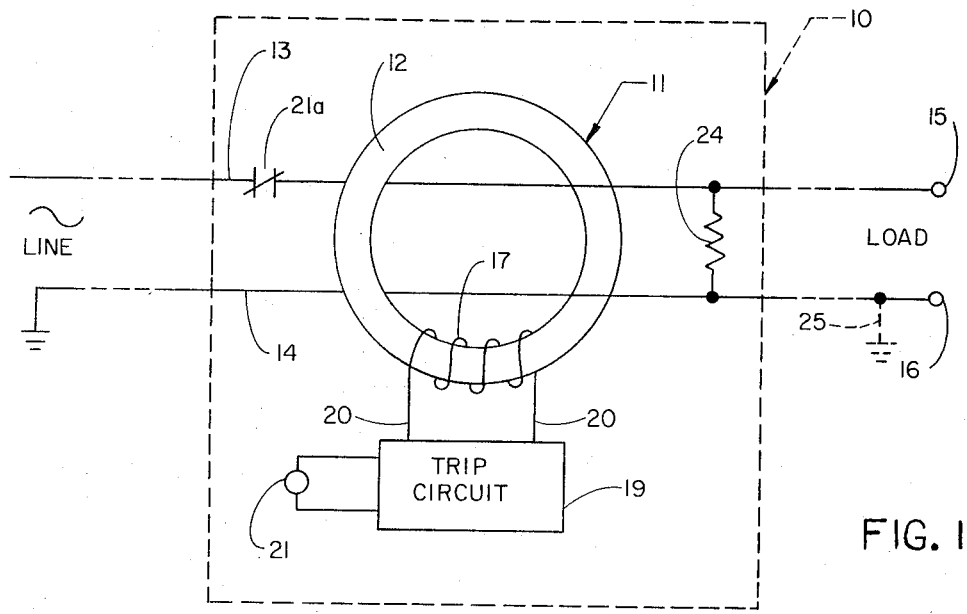
FIG. 1 is a schematic diagram of one embodiment of differential ground leakage protective apparatus in accordance with this invention.

Referring to the FIG. 1, there is illustrated a ground fault protection system 10 in accordance with the present invention incorporating a differential transformer 11 preferably having a toroidal core 12. Although it will become apparent that the operation of the protection system 10 of the present invention is not dependent upon the supply voltage or the number of conductors, for simplicity there is illustrated a conventional 120 volt supply line having a normally ungrounded conductor or hot wire 13 and a conductor 14 normally grounded at the source of power.

The conductors 13 and 14 pass through the core 12 to form single turn primaries of the differential transformer 11 and continue for connection to a load at the terminals 15 and 16. A secondary winding 17 comprising a plurality of turns is wound on the core 12 and connected to a trip circuit 19 by a pair of conductors 20. The trip circuit 19 interprets and amplifies the voltage signal from the secondary winding 17 of the differential transformer 11 and operates a relay or shunt trip circuit breaker 21, opening its normally-closed contacts 21a interposed in the normally ungrounded conductor 13.

In accordance with this invention, a means to provide a leakage current such as a resistor 24 is connected between the conductors 13 and 14 on the load side of the differential transformer 11 and in parallel with the load terminals 15 and 16. The ohmic value of the resistor 24 is preferably selected to draw a current not less than the minimum tripping current of the ground fault protective system. For example, for a protective system sensitive to a fault current of 5 milliamperes on a supply system of 120 volts, the resistor 24 would be selected to have a resistance value of 24,000 ohms.

Under normal operation of the system, when no inadvertant ground exists, equal and opposite currents flow through the conductors 13 and 14 so that no tripping voltage signal is generated in the secondary winding 17 of the differential transformer 11. While an external load is connected to the supply system, a ground fault either in the normally grounded conductor 14 or normally ungrounded conductor 13 will cause an imbalance of currents in the differential transformer 11 triggering the trip circuit 19 to open the contacts 21a.

In a ground fault protective system not including the resistor 24, should a low impedance ground fault occur in the normally grounded conductor 14, as shown at 25, under conditions when no load is connected, the circuit breaker will not function. Since no current passes through the conductors 13 and 14, there is no leakage to ground and no resulting current unbalance. Should a ground fault occur in the normally ungrounded conductor 13 either before a load is connected, as by a grounded child putting his finger into an electric outlet, or simultaneously with the application of a load, as a grounded man plugging in a lamp cord having frayed insulation exposing the hot wire 13 to his touch, the sensitivity of the differential transformer 11 will be sufficiently diminished to prevent operation of the circuit breaker until a large and possibly lethal current has passed through the person.

If the low impedance ground fault 25 were to occur in a circuit protected by the ground fault protection system 10 including the resistor 24, even under no-load conditions, a sufficient amount of the current flowing through the resistor 24 would also flow through the ground 25 causing the necessary current unbalance in the differential transformer 11 to open the contacts 21a. Should the fault 25 be a high impedance ground, the current unbalance would not be sufficient to cause triggering of the trip circuit 19. However, this impedance would prevent the great decrease in sensitivity caused by a low impedance ground and the current drawn by the resistor 24 would add to the current drawn by a hot wire ground fault to open the contacts 21a at a safe current level.

The use of ground fault protective system of the present invention with more than two conductors will be apparent to those skilled in the art. Only one resistor 24 need still be used, connected between any one normally ungrounded conductor 13 and the normally grounded conductor 14. The value of the resistor 24 would be chosen based on the desired tripping current of the differential transformer 11 and the potential difference between the supply conductors.

Figure 2:
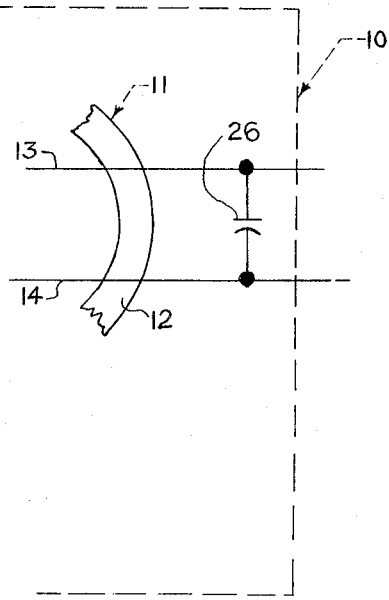
FIG. 2 is a fragmentary wiring diagram illustrating another embodiment of the protective apparatus of this invention.

An alternate embodiment of the protective system of the present invention is shown in FIG. 2. The core 12 of the differential transformer 11 of FIG. 1 is shown in fragmentary form with the normally ungrounded conductor 13 and the normally grounded conductor 14 passing therethrough for connection to load terminals 15 and 16 respectively. Instead of the resistor 24 of FIG. 1, a capacitor 26, of suitable capacitance, is used to provide a leakage path between conductors 13 and 14 on the load side of the transformer 11. The capacitor should preferably be chosen to draw a current not less than the minimum tripping current of the ground fault protective system. For example, for a protective system sensitive to a fault current of 5 milliamperes on a supply system of 120 volts, a capacitor would be selected to have a capacitive reactance value of 24,000 ohms.

Thus a ground fault protection system has been disclosed which simply, efficiently and economically provides protection against ground faults in normally grounded and normally ungrounded conductors, with or without the existence of an external load.

I claim:

1. A ground fault protection system for interposition in an electric supply system having first and second conductors extending from a source of alternating current to terminals connectible to a load, said first conductor being normally grounded on a source side of the ground fault protection system, said ground fault protection system comprising differential transformer means having a first primary winding connected in series with said first conductor and having a second primary winding connected in series with said second conductor, circuit interrupting means responsive to an unbalanced current flow of a predetermined differential value in said primary windings to interrupt the circuit through said second conductor, said conductors being respectively connected without added impedance between said primary windings and said terminals, and means permanently connected solely and directly to said first and second conductors on a load side of said primary windings at points between said primary windings and said terminals, said permanently connected means having a constant impedance of a value such that a current approximately equal to said predetermined differential value of unbalanced current flows therethrough and through said primary windings, whereby the occurrence of a ground on the first conductor on the load side of said first primary winding diverts a portion of the current flowing through said permanently connected means around the first primary winding to said source to establish an unbalance in said primary windings regardless of whether a load is connected to said terminals.

2. A system as in claim 1 wherein the permanently connected means is a resistor.

3. A system as in claim 1 wherein the permanently connected means is a capacitor.

* * * * *